3,009,888
DIFFICULTLY INFLAMMABLE EXPANDABLE STYRENE POLYMER CONTAINING AN ACETAL OR ETHER OF 2,3-DIBROMOPROPANOL-1 AND METHOD OF PREPARING SAME
Heinz Mueller-Tamm, Fritz Stastny, and Karl Buchholz, Ludwigshafen (Rhine), Germany, assignors to Badische Anilin- & Soda-Fabrik Aktiengesellschaft, Ludwigshafen (Rhine), Germany
No Drawing. Filed July 1, 1958, Ser. No. 745,823
Claims priority, application Germany July 13, 1957
12 Claims. (Cl. 260—2.5)

This invention relates to difficulty inflammable styrene polymers and a process for the production of such styrene polymers.

In a copending application filed by Karl Buchholz and Fritz Statstny on March 4, 1957, under Serial No. 643,-553, it is disclosed that difficulty inflammable styrene polymers can be obtained by combining styrene polymers with a small amount of an ester of 2,3-dibromopropanol-1 or combining monomeric styrene with a small amount of an ester of 2,3-dibromopropanol-1 and then subjecting the monomeric styrene to polymerization.

Although it is true that there are obtained from styrene polymers and esters of 2,3-dibromopropanol-1, difficulty inflammable mixtures with excellent properties because the esters exert practically no softening action and also because in the polymerization or copolymerization of the styrene in the presence of the ester there is no risk of disadvantage by reason of chain-breaking reactions, the use of these esters for the flame-resistant equipment of styrene polymers leads to complications in some cases. In the polymerization of styrene in aqueous suspension, for example, the ester may be partially saponified. The decomposition of the ester into alcohol and acid may then lead to premature coagulation of the suspension or to other disadvantages.

These disadvantages are avoided by the present invention while preserving the advantages which the use of esters of 2,3-dibromopropanol-1 offers, the present invention providing new difficulty inflammable styrene polymers. A further object of this invention is a simple process for the production of such difficulty inflammable styrene polymers. In particular, the invention provides difficulty inflammable expandable styrene polymers and a process for the production of such polymers. A further object of the invention is to provide difficulty inflammable porous styrene polymers.

The objects of the invention are achieved by adding a small amount of an acetal or ether or 2,3-dibromopropanol-1 to a styrene polymer. It is preferable to add the bromine compound to the monomeric styrene and to polymerize the mixture by known methods. Neither the molecular weight nor the softening range of the styrene polymers are changed appreciably thereby. The acetals and ethers of 2,3-dibromopropanol-1 moreover are stable under the usual conditions of the suspension polymerization of styrene so that there is no danger of the suspensions coagulating prematurely.

Suitable acetals are for example the full acetals of 2,3-dibromopropanol-1 with chloral, formaldehyde, glyoxal, dibromopropionaldehyde, acetaldehyde and the like.

The bromine-containing ethers may be prepared by adding bromine to the corresponding allyl ethers. Instead of the allyl alcohol of the ether component, there may also be used a higher homologue of allyl alcohol. Suitable ethers of dibromopropanol include the bromination products of methyl allyl ether and the higher homologues, diallyl ether, ethyleneglycol diallyl ether, glycerine triallyl ether, pentaerythritol tetra-allyl ether, butenediol diallyl ether, erythritol tetra-allyl ether, trimethylolpropane triallyl ether and the like.

The amount of the bromine-containing acetals or ethers is preferably chosen so that in the finished mixture, the bromine content, with reference to the weight of the styrene polymer, amounts to 0.5 to 6% by weight and preferably, from 1.5 to 5% by weight.

The bromine compounds may be added to the ready-made styrene polymers and the mixing apparatus usual in the plastics industry may be used, such as calenders, kneaders or extruders. It is preferable to add the bromine compounds to the monomers prior to or during the polymerization. In this way, without additional mechanical or thermal treatment, difficulty inflammable styrene polymers are directly obtained. Moreover, in this way a homogeneous dispersion of the flame-preventing bromine compounds in the styrene polymers is achieved especially simply.

The polymerization is carried out in known manner. It is possible to polymerize in the block or by the suspension, solution or emulsion process. It is preferred to use the suspension or bead polymerization processes with polymerization temperatures of between 40° and 100° C. To initiate the polymerization it is preferable to use radical-forming polymerization catalysts, as for example peroxides, such as benzoyl peroxide, lauroyl peroxide, cyclohexanone peroxide, or azo compounds, such as azo-di-isobutyronitrile.

Other monomeric compounds, preferably other vinyl compounds, such as nuclear-substituted or side-chain-substituted styrenes, acrylonitrile, vinylcarbazole, acrylic esters, methacrylic esters such a methyl methacrylate, vinyl esters and the like, may also be copolymerized with the styrene. The styrene polymers according to this invention should contain at least 50% of styrene. Linear styrene polymers with thermoplastic properties are of special interest for the invention. However, branched or cross-linked styrene polymers may also be used such as those which contain a small amount of a bifunctional compound. Among these polymers, lightly branched styrene polymers with up to 1% of divinyl-benzene or another vinyl compound are suitable.

According to one embodiment of the invention which is of special interest, expandable difficultly inflammable styrene polymers can be prepared. For this purpose there is added to the mixture of monomeric styrene and an ether or acetal of 2,3-dibromopropanol-1 a blowing agent which is capable of expanding the finished styrene polymer when heated. Such blowing agents are for example readily volatile liquids which preferably do not dissolve the styrene polymer, or also gases. As examples of such liquid blowing agents there may be mentioned aliphatic and cycloaliphatic hydrocarbons with boiling points or boiling limits between 20° and 60° C., such as petroleum ether, pentane, hexane, cyclopentane or cyclohexane. Other suitable blowing agents are propane, butane and gaseous halogenated hydrocarbons, such as difluorodichloromethane. The mixtures containing a blowing agent are expanded by heating them to temperatures above the softening range of the styrene polymers. There are thereby obtained difficultly inflammable porous styrene polymers with closed cells and of low specific gravity which can be used in numerous fields of industry, for example as insulating material against heat, cold and sound.

It is also possible to prepare difficultly inflammable expandable styrene polymers by treating subsequently with a blowing agent a styrene polymer which has been made difficultly inflammable. In general, however, it is preferred to add the flame-resistant bromine compounds and the blowing agent to the monomers.

The expression "difficultly inflammable" used in this specification means that the styrene polymer will burn only in an extraneous flame but will become extinguished as soon as the extraneous flame is removed.

The following examples will further illustrate this invention but the invention is not restricted to these examples. The parts specified in the examples are parts by weight.

*Example 1*

A mixture of 4000 parts of water, 13 parts of barium sulfate, 1940 parts of styrene, 6 parts of benzoyl peroxide and 60 parts of formaldehyde-di-(2,3-dibromopropyl)-acetal is heated in a stirring autoclave for 25 hours at 70° C. and for 10 hours at 80° C. The polymer formed is precipitated in the form of small globules. It is filtered off, washed and dried at 70° C.

The polymer has practically the same properties as the usual commercial polystyrene. The molecular weight and softening point have fallen only inappreciably. Shaped articles prepared by injection moulding will burn only with difficulty while they are held in a flame. After removing the extraneous flame they become extinguished immediately.

*Example 2*

A mixture of 4000 parts of water, 13 parts of barium sulfate, 1940 parts of styrene, 6 parts of benzoyl peroxide and 60 parts of di-(2,3-dibromopropyl) ether is treated under the same conditions as in Example 1. A polymer is obtained which also shows good mechanical test values and of which the molecular weight and softening point have scarcely fallen. Shaped articles prepared by injection moulding have the same flame resistance as those prepared according to Example 1.

*Example 3*

6000 parts of water, 82 parts of a protective colloid consisting of a copolymer of 95% of N-vinylpyrrolidone and 5% of methyl acrylate, 5 parts of sodium pyrophosphate, 5600 parts of styrene, 1030 parts of alpha-methylstyrene, 31 parts of benzoyl peroxide, 10 parts of di-tertiary-butyl peroxide, 416 parts of petroleum ether (boiling point 25° to 35° C.) and 280 parts of formaldehyde-di-(2,3-dibromopropyl)-acetal are heated in a vessel with a stirring mechanism under 3 excess atmospheres of nitrogen for 20 hours at 70° C. and for 10 hours at 100° C. The polymer formed is washed and dried at room temperature. Particles having about the size of rice grains are obtained.

By heating to 95° to 100° C., for example in boiling water, the polymer thus obtained expands to three to four times its original volume and may be worked up by suitable moulds into plates, blocks or shaped articles of any kind. The bulk density of this foamed-up material amounts to 20 to 30 kilograms per cubic metre.

When the blowing agent has evaporated after storage at 40° to 50° C., the foamed-up material burns only with difficulty and is extinguished immediately after removal from the extraneous flame.

*Example 4*

1000 parts of water, 3 parts of the protective colloid of Example 3, 0.1 part of sodium pyrophosphate, 764 parts of styrene, 191 parts of acrylonitrile, 45 parts of glyoxal-tetra-(2,3-dibromopropyl)-acetal, 3.5 parts of benzoyl peroxide and 75 parts of petroleum ether (boiling point 35° to 50° C.) are heated at 70° C. in a stirring vessel for 30 hours while stirring after 4 excess atmospheres of nitrogen have been forced in.

The polymer thus formed may be worked up, as described in Example 3, into foamed-up articles which are flame-resistant and moreover stable to aliphatic hydrocarbons, as for example motor gasoline.

*Example 5*

A solution of 20 parts of polystyrene, 80 parts of styrene, 6 parts of petroleum ether (pentane fraction), 4 parts of 2,3-dibromopropoxyethyl 2',3'-dibromopropyl ether, 2 parts of lauroyl peroxide are charged into a container which is then well closed and kept for 8 weeks at 24° to 30° C. Within this time the contents harden to a solid block. The polymer formed is ground and can then be worked up, as described in Example 3, into flame-resistant porous articles having densities of down to 0.02 to 0.04 gram per cc.

*Example 6*

65 parts of glyoxal-tetra-(2,3-dibromoproyl)-acetal are mixed into 1000 parts of polystyrene on mixing rollers at 140° C. The mixture is comminuted in a cross-beater mill so that particles are formed having a diameter of about 1 to 3 millimetres. These particles are stored in a stirring vessel in a mixture of 5000 parts of water and 80 parts of petroleum ether of the boiling limits 45° and 50° C. with rapid stirring at 30° to 40° C. for 96 hours. The particles of plastic containing petroleum ether obtained are dried for a short time in the air and charged into a perforated closable mould so that the latter is filled to about 10% of its volume with the expandable plastic, expanded by heating with steam at 107° C. and thereby sintered. The mould is cooled and a foamed-up article of the specific gravity 0.1 is obtained which will burn only in an extraneous flame.

*Example 7*

A tightly closable metal container is filled with the following mixture:

400 parts of styrene,
2 parts of divinylbenzene,
28 parts of hexane,
32 parts of formaldehyde-di-(2,3-dibromopropyl)-acetal, and
8 parts of benzoyl peroxide.

The closed container is kept for 8 days at 24° C. and then for 20 days at 35° C. A compact block is obtained which is cut into plates of 6 millimetres thickness. The plates are stored for 12 minutes in a steam autoclave at 110° C. (1 excess atmosphere of steam) and cooled. A difficultly inflammable foamed-up article is obtained having a bulk density of 0.045 gram per cc. which can be used in the decoration industry.

*Example 8*

A pressure vessel provided with a stirrer is filled with 20,000 parts of water and 7.5 parts of an alkyl sulfonate. To this aqueous solution there are added 7500 parts of a bead-shaped copolymer of 85% of styrene and 15% of acrylonitrile. The vessel is closed, 3 atmospheres of nitrogen are forced in and the contents of the vessel heated to 60° C. while stirring (150 r.p.m.). Then, with further stirring, there is continually pumped into the vessel a mixture of 550 parts of methanol, 450 parts of formaldehyde-di(2,3-dibromopropyl)-acetal and 500 parts of commercially pure butane (boiling point at 760 mm. Hg −10° C. to +5° C.) at a speed of 60 parts per hour. The pumping in is concluded after 25 hours. The vessel is cooled, the bead-like product filtered by suction and dried for a short time at temperatures up to 20° C. The product may be used for the production of foamed-up articles which will burn only in an extraneous flame.

*Example 9*

12,000 parts of water, 30 parts of a copolymer of 94% of vinylpyrrolidone and 6% of methyl acrylate and also 6 parts of sodium pyrophosphate are introduced into a pressure vessel provided with a stirrer. The vessel is closed, the contents stirred for a short time, and 2 atmospheres of nitrogen forced in. Then, with further stirring there is forced into the vessel a solution of 600 parts of di-(2,3-dibromopropyl) ether, 40 parts of lauroyl peroxide and 1000 parts of difluorodichloromethane in 10,000 parts of styrene and the contents polymerized at 80° C. for 30 hours. After cooling, a polymer is obtained in the form of beads of 0.5 to 3 mm. diameter which are centrifuged off. Flame resistant foamed-up articles may be prepared from the bead-like polymer.

We claim:
1. A difficultly inflammable expandable polystyrene containing a volatile nonsolvent for polystyrene having a boiling point between 20° and 60° C., and containing from 0.5 to 6% by weight with reference to the weight of said polystyrene of a 2,3-dibromopropanol-1 compound selected from the group consisting of formaldehyde-di-(2,3-dibromopropyl) acetal, glyoxal-tetra-(2,3-dibromopropyl) acetal, di-(2,3-dibromopropyl) ether, methyl-(2,3-dibromopropyl) ether, ethyleneglycol-di-(2,3-dibromopropyl) ether, glycerine-tri-(2,3-dibromopropyl) ether, pentaerythritol-tetra(2,3-dibromopropyl) ether, butenediol-di-(2,3-dibromopropyl) ether, erythritol-tetra-(2,3-dibromopropyl) ether and trimethylolpropane tri-(2,3-dibromopropyl) ether.

2. A composition of matter as claimed in claim 1 in which the polystyrene is a copolymer of styrene and other monomeric compounds, said copolymer containing at least 50% per weight of styrene.

3. A difficultly inflammable expandable polystyrene containing a volatile nonsolvent for the polystyrene having a boiling point between 20° and 60° C. and from between 0.5 to 6% by weight with reference to the weight of said polymer of formaldehyde-di-(2,3-dibromoproply)-acetal.

4. A difficultly inflammable expandable copolymer of styrene and acrylonitrile containing at least 50% by weight of styrene, a volatile nonsolvent for the aforesaid copolymer having a boiling point between 20° and 60° C. and 0.5 to 6% by weight with reference to the weight of the copolymer of a 2,3-dibromopropanol-1 compound selected from the group consisting of formaldehyde-di-(2,3-dibromopropyl) acetal, glyoxal-tetra-(2,3-dibromopropyl) acetal, di - (2,3 - dibromopropyl) ether, methyl-(2,3-dibromopropyl) ether, ethyleneglycol - di - (2,3 - dibromopropyl) ether, glycerine-tri-(2,3-dibromopropyl) ether, pentaerythritol-tetra-(2,3-dibromopropyl) ether, butenediol-di-(2,3-dibromopropyl) ether, erythritol-tetra-(2,3-dibromopropyl) ether and trimethylolpropane tri-(2,3-dibromopropyl ether.

5. A difficultly inflammable expandable copolymer of styrene and divinylbenzene containing at least 50% by weight of styrene, a volatile nonsolvent for the aforesaid copolymer having a boiling point between 20° and 60° C. and 0.5 to 6% by weight with reference to the weight of the copolymer of a 2,3-dibromopropanol-1 compound selected from the group consisting of formaldehyde-di-(2,3-dibromopropyl) acetal, glyoxal-tetra-(2,3-dibromopropyl) acetal, di-(2,3-dibromopropyl) ether, methyl-(2,3 - dibromopropyl) ether, ethyleneglycol - di - (2,3-dibromopropyl) ether, glycerine - tri - (2,3-dibromopropyl) ether, pentaerythritol - tetra-(2,3-dibromopropyl) ether, butenediol-di-(2,3-dibromopropyl) ether, erythritol-tetra-(2,3-dibromopropyl) ether and trimethylolpropane tri-(2,3-dibromopropyl) ether.

6. A process for the production of difficultly inflammable expandable polystyrene which comprises: incorporating in said polystyrene (1) a volatile nonsolvent for polystyrene having a boiling point between 20° and 60° C. and (2) 0.5 to 6% by weight with reference to the weight of said polymer of a 2,3-dibromopropanol-1 compound selected from the group consisting of formaldehyde-di-(2,3-dibromopropyl) acetal, glyoxal - tetra - (2,3-dibromopropyl) acetal, di - (2,3 - dibromopropyl) ether, methyl-(2,3-dibromopropyl) ether, ethyleneglycol-di-(2,3-dibromopropyl) ether, glycerine-tri-(2,3-dibromopropyl) ether, pentaerythritol - tetra - (2,3 - dibromopropyl) ether, butenediol-di-(2,3-dibromopropyl) ether, erythritol-tetra-(2,3-dibromopropyl) ether and trimethylolpropane tri-(2,3-dibromopropyl) ether.

7. A process as claimed in claim 6 in which the polystyrene is a copolymer of styrene with other monomeric compounds, the copolymer containing at least 50% by weight of polymerized styrene.

8. A process for the production of difficultly inflammable expandable polystyrene which comprises: adding to monomeric styrene a volatile nonsolvent for polystyrene having a boiling point between 20° and 60° C. as a blowing agent and 0.5 to 6% by weight with reference to the weight of said styrene of a 2,3-dibromopropanol-1 compound selected from the group consisting of formaldehyde-di-(2,3-dibromopropyl) acetal, glyoxal - tetra - (2,3-dibromopropyl) acetal, di - (2,3 - dibromopropyl) ether, methyl-(2,3-dibromopropyl) ether, ethyleneglycol-di-(2,3-dibromopropyl) ether, glycerine-tri-(2,3-dibromopropyl) ether, pentaerythritol-tetra - (2,3 - dibromopropyl) ether, butenediol-di-(2,3-dibromopropyl) ether, erythritol-tetra-(2,3-dibromopropyl) ether and trimethylolpropane tri-(2,3-dibromopropyl) ether, and thereafter polymerizing the resultant mixture.

9. A process as claimed in claim 8 in which the polymerization is carried out in an aqueous suspension.

10. A process as claimed in claim 8 in which styrene is copolymerized with other monomeric compounds, the resulting copolymers containing at least 50% per weight of styrene with reference to the total polymer.

11. A process for the production of difficultly inflammable expanded polystyrene which comprises: polymerizing in aqueous suspension styrene, said aqueous suspension containing (1) a volatile nonsolvent for polystyrene having a boiling point between 20° and 60° C. as a blowing agent and (2) 0.5 to 6% by weight with reference to the weight of the styrene of a 2,3-dibromopropanol-1 compound selected from the group consisting of formaldehyde-di-(2,3-dibromopropyl) acetal, glyoxal - tetra - (2,3-dibromopropyl) acetal, di - (2,3 - dibromopropyl) ether, methyl-(2,3-dibromopropyl) ether, ethyleneglycol-di-(2,3-dibromopropyl) ether, glycerine-tri-(2,3-dibromopropyl) ether, pentaerythritol-tetra-(2,3-dibromopropyl) ether, butenediol-di-(2,3-dibromopropyl) ether, erythritol-tetra-(2,3-dibromopropyl) ether and trimethylolpropane tri-(2,3-dibromopropyl) ether, and heating the resultant polystyrene beads to a temperature above the softening point of the polystyrene thereby expanding the polystyrene.

12. A process as claimed in claim 11 in which styrene is copolymerized with other monomeric compounds, the resultant copolymer containing at least 50% by weight of polymerized styrene with reference to the copolymer.

References Cited in the file of this patent
UNITED STATES PATENTS

| | | |
|---|---|---|
| 2,676,927 | McCurdy et al. | Apr. 27, 1954 |
| 2,723,963 | Price et al. | Nov. 15, 1955 |
| 2,744,291 | Stastny et al. | May 8, 1956 |
| 2,848,428 | Rubens | Aug. 19, 1958 |

UNITED STATES PATENT OFFICE
CERTIFICATE OF CORRECTION

Patent No. 3,009,888                      November 21, 1961

Heinz Mueller-Tamm et al.

It is hereby certified that error appears in the above numbered patent requiring correction and that the said Letters Patent should read as corrected below.

Column 1, line 51, for "or", second occurrence, read -- of --; lines 13, 18, 26, 41, 43, 45, 47, and column 2, line 12, for "difficulty", each occurrence, read -- difficultly --.

Signed and sealed this 1st day of May 1962.

(SEAL)
Attest:

ERNEST W. SWIDER
Attesting Officer

DAVID L. LADD
Commissioner of Patents